No. 643,948. Patented Feb. 20, 1900.
A. B. CULVER.
BASKET FOR PACKING FRUIT.
(Application filed Dec. 9, 1899.)
(No Model.)
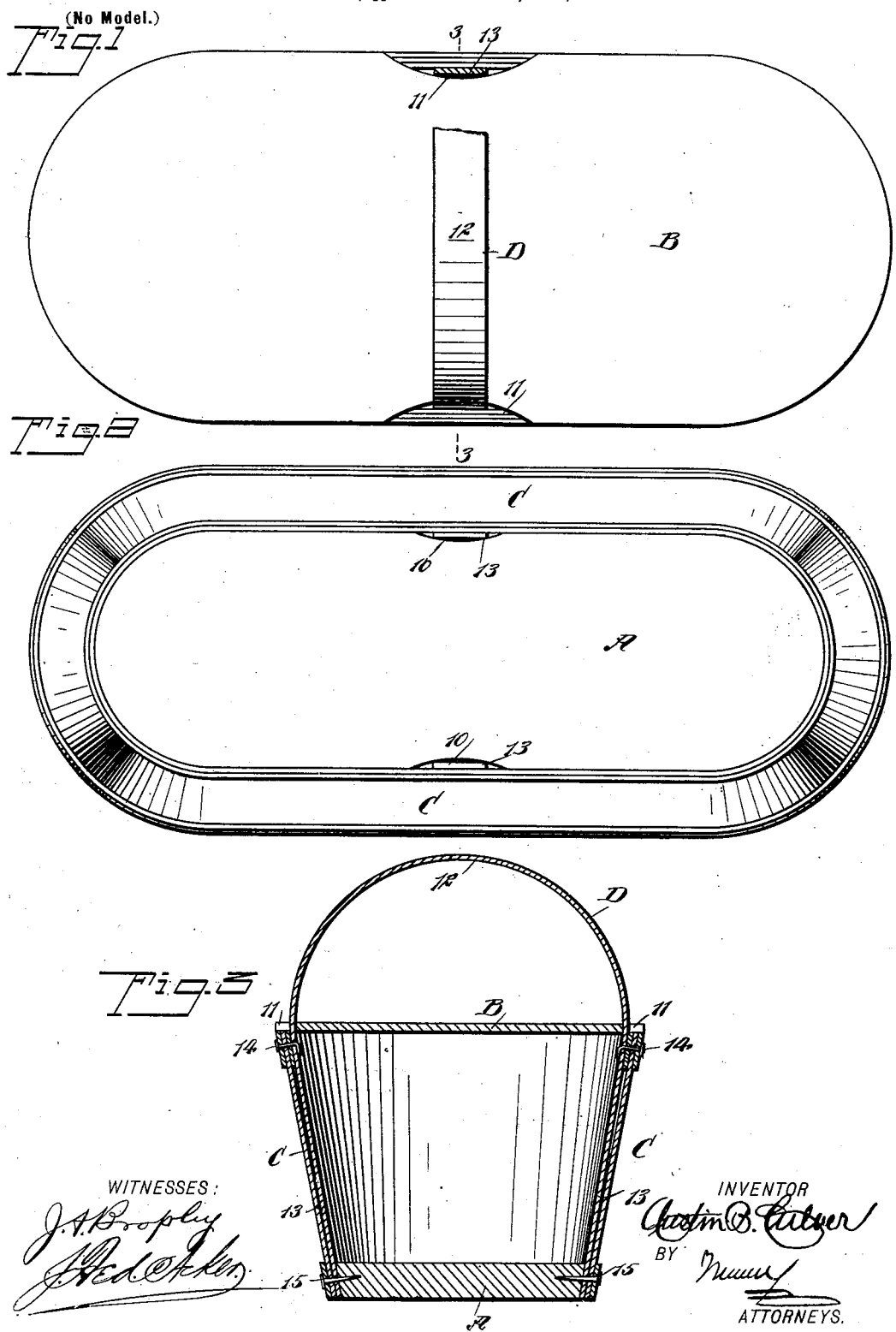

United States Patent Office.

AUSTIN B. CULVER, OF WESTFIELD, NEW YORK.

BASKET FOR PACKING FRUIT.

SPECIFICATION forming part of Letters Patent No. 643,948, dated February 20, 1900.

Application filed December 9, 1899. Serial No. 739,800. (No model.)

*To all whom it may concern:*

Be it known that I, AUSTIN B. CULVER, a citizen of the United States, residing at Westfield, in the county of Chautauqua and State of New York, have invented a new and Improved Basket for Packing Fruit, of which the following is a full, clear, and exact description.

An object of the invention is to provide a basket adapted for packing fruit, especially grapes, in which the usual cover hooks or wires are dispensed with and the handle is so placed with relation to the body and the cover has such relation to the handle that one will serve as a lock to the other.

Another object of the invention is to provide a handle that may be sprung without a tendency to loosen its fastenings and without detriment to the body of the basket and to so construct the cover that when the handle is depressed or sprung it will release the cover to such an extent that it may be partially or wholly removed, enabling the contents of the basket to be conveniently inspected.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved basket, a portion of the handle being broken away. Fig. 2 is a bottom plan view of the basket, and Fig. 3 is a transverse section taken substantially on the line 3 3 of Fig. 1.

The basket is preferably made of wood throughout, and the body of the basket consists of a bottom A, a top B, and sides C, upon the upper edge of which sides the top B has bearing. The bottom A is provided centrally at each side with a gain 10, and the cover B is provided centrally at each side with a corresponding gain 11. These gains may be of any desired shape, but usually the gains in the cover B are of semicircular formation, as is clearly shown in Fig. 1. The handle D, which is of a spring material or a material that may be bowed when compressed, is so constructed that its arched upper or body portion 12 extends across and above the body, and the legs or lower members 13 of the handle extend downward in engagement with the inner face of the side portions of the body of the basket and through or into the gains 10 in the bottom A of the basket. The side sections or members 13 of the handle D are secured to the upper portion of the sides of the basket through the medium of clenched nails 14, although other means may be employed, and usually the lower ends of the side members of the handle are secured to the bottom A of the basket through the medium of pins or nails 15 or their equivalents, as shown in Fig. 3. Thus it will be observed that the handle is positively and securely attached to the body of the basket and that when the upper bow or body section 12 of the handle is pressed downward the sides of the basket will be sprung outward to a certain extent.

When the cover B is in position on the body of the basket, the gains 11 in the side edges of the cover receive the side members of the handle where they connect with the body, and as soon as the body or bow portion 12 of the handle is pressed downward and the sides of the basket thus forced outward the cover B may be readily removed, especially when the cover is carried upward edgewise and is at the same time drawn outward, as the peculiar formation of the gains 11 will tend to effect such a result. If the cover is not to be entirely removed, it may be carried upward sufficiently while yet in position over the body to enable the contents of the body of the basket to be conveniently inspected. When the cover is in horizontal position on the body of the basket, it is held in such position by reason of the sides of the handle D being in frictional engagement with the walls of the gains at their centers, and such frictional engagement is sufficient to hold the cover under almost all conditions of usage to the body of the basket, and therefore fastening devices—such as hooks, tacks, staples, or wiring—are not required. Where fastening devices requiring the use of a hammer are employed, the fruit contained in the body of the basket is frequently seriously injured by the shock incident to the attachment of the cover to the body of the basket. All such danger is obviated by the use of the cover above described.

Having thus described my invention, I claim as new and desire to secure by Letters Patent—

1. A basket, the body of which is provided with a cover having gains in its side edges, a handle the side members whereof extend through the gains in the cover, in engagement with the walls of the said gains, the side members of the handle being securely attached to the body of the basket, and the handle being constructed of an elastic material.

2. A basket, the body of which is provided with a handle of elastic material, the side members of the handle extending along the inner face of the side portions of the body of the basket, means for attaching the handle to the top and bottom portions of the body, and a cover loosely mounted on the body, having opposing gains in its side edges, through which gains the side members of the handle extend, for the purpose specified.

In testimony whereof I have signed my name to this specification in the presence of two subscribing witnesses.

AUSTIN B. CULVER.

Witnesses:
J. A. SKINNER,
E. D. REAGAN.